US006801753B1

(12) United States Patent
Keong

(10) Patent No.: US 6,801,753 B1
(45) Date of Patent: Oct. 5, 2004

(54) METHOD AND DEVICE AT A TRANSMITTER AND RECEIVER UNIT IN A MOBILE TELEPHONE SYSTEM

(75) Inventor: Teng Boon Keong, Singapore (SG)

(73) Assignee: Diator Netcom Consultants AB, Sundbyberge (SE)

( * ) Notice: Subject to any disclaimer, the term of this patent is extended or adjusted under 35 U.S.C. 154(b) by 0 days.

(21) Appl. No.: 09/509,261

(22) PCT Filed: Oct. 5, 1999

(86) PCT No.: PCT/SE99/01770

§ 371 (c)(1), (2), (4) Date: Feb. 26, 2001

(87) PCT Pub. No.: WO00/57510

PCT Pub. Date: Sep. 28, 2000

(30) Foreign Application Priority Data

Mar. 24, 1999 (SE) .............................................. 9901085

(51) Int. Cl.[7] .................................................. H04B 1/44

(52) U.S. Cl. ....................................... 455/3.01; 333/248

(58) Field of Search ............................... 455/3.01, 3.03, 455/3.06, 11.1, 81, 7, 129, 41.1, 41.2, 66.1, 426.1; 332/239, 248, 249; 370/338; 333/208, 212

(56) References Cited

U.S. PATENT DOCUMENTS 5,668,562 A 9/1997 Cutrer et al.
5,977,851 A * 11/1999 Stancil et al. ............... 333/248
5,994,984 A * 11/1999 Stancil et al. ............... 333/248
6,058,292 A * 5/2000 Terreault ...................... 455/78
6,128,470 A * 10/2000 Naidu et al. .................. 455/16
6,426,970 B1 * 7/2002 Thornton et al. ........... 375/220

FOREIGN PATENT DOCUMENTS

| | | |
|---|---|---|
| FI | 31883 | 7/1961 |
| JP | 7-177066 | 7/1995 |
| JP | 7-177068 | 7/1995 |
| JP | 7-177070 | 7/1995 |
| JP | 7-193411 | 7/1995 |
| JP | 7-193412 | 7/1995 |
| WO | WO 99/26310 | 5/1999 |

OTHER PUBLICATIONS

Christopher P. Diehl et al., "Wireless RF Distribution in Buildings Using Heating and Ventilation Ducts," Proceedings of 8th Virginia Tech/MPRG Symposium on Wireless Personal Communications, Jun. 10–12, 1998, Blacksburg, Virginia.

* cited by examiner

*Primary Examiner*—Nick Corsaro
(74) *Attorney, Agent, or Firm*—Wolf, Greenfield & Sacks, P.C.

(57) ABSTRACT

A method and apparatus for providing communication signals via air or other ducting in a building. Two-way mobile telephone communications between a mobile telephone in a building and an antenna in one or more air ducts may be provided. In one embodiment, wireless communication between at least two antennas in a ventilation duct and rooms and spaces in a building may be provided without the use of bi-directional couplers or re-radiators. In another embodiment, a first signal may be emitted from an antenna in a ventilation duct of a building and the first signal transmitted by the duct for passage through an opening into a room or space in the building. A second signal may be received into the duct through the opening and transmitted by the duct from the opening for reception by the antenna.

27 Claims, 2 Drawing Sheets

METHOD AND DEVICE AT A TRANSMITTER AND RECEIVER UNIT IN A MOBILE TELEPHONE SYSTEM

CROSS REFERENCE TO RELATED APPLICATIONS

This application is a National Stage of International Application No. PCT/SE99/01770, filed Oct. 5, 1999, which claims priority to Swedish patent application 9901085-2, filed Mar. 24, 1999.

BACKGROUND OF THE INVENTION

1. Field of Invention

The present invention relates to a method pertaining to a transmitter and receiver unit in a mobile telephone system. The invention also relates to an arrangement for carrying out the method.

More specifically, the invention relates to a method and to an arrangement for mobile telephone systems in large buildings, and particularly in very tall buildings such as so-called skyscrapers. The mobile telephone system may be any known wireless mobile system, for instance a GSM system. The invention is described below with reference to a GSM system, although it will be understood that the invention is not restricted to this particular type of system. For instance, the system may be a PABX system or a wireless-LAN-system. The present invention can also be applied in fully internal wireless mobile telephone systems in large buildings, where the internal system is connected to the outside world via an existing telephone network.

2. Description of Related Art

The use of a mobile system in large buildings, and then particularly in skyscrapers, presents serious problems unless measures are taken in the buildings concerned. This is due to several reasons. One reason is the actual building itself, since a skyscraper will normally include a significant number of reinforcement bars, steel beams, etc., which tend to screen the building magnetically from the outside world. The metal coated panes of facade glass with which such buildings are normally covered to a large extent also have this affect. It is also necessary in a high building to install a large number of base stations which communicate with the mobile telephones and which are able to cover the whole of the building area. This can present a system problem with respect to the base station with which a given mobile telephone shall communicate.

Another problem is one of providing effective radio coverage within large buildings. When ground-mounted base stations are used, this is due to attenuation of the radio signals caused by the building, and consequently coverage will become poorer further into a building. By ground-mounted base stations is meant base stations that are placed outdoors.

A further problem resides in the requirement of a high network capacity in large buildings, owing to the large number of users in such buildings. For instance, if a high building has good radio contact with ground base stations the users in said building will take a large part of the capacity of such base stations, therewith reducing the base station capacity for users outside the building. Furthermore, there will often be interference between different base stations covering the building, resulting in poor speech quality and, at times, in lost connections.

Consequently, mutually separate internal mobile telephone systems are often installed in large and high buildings.

Skyscrapers and large buildings have been mentioned in the aforegoing. By large buildings is also meant large public complexes or buildings, such as airport buildings, railroad stations, restaurants, office buildings, and so on.

SUMMARY OF THE INVENTION

The present invention is not restricted to any particular type of building, but can be applied in all manner of buildings which due to their size and/or configuration necessitate the installation of separate systems that include comprehensive cabling, a large number of antennas, etc., when practicing known techniques, in order to obtain satisfactory mobile telephone traffic with good coverage within the building concerned. What is strived for is higher speech quality, better coverage and greater capacity.

Such separate installations include a local transceiver unit which is connected to the fixed part of a mobile telephone network installed in the building. The transceiver unit is a base transceiver station that corresponds to a typical base station in a GSM network. Cables are drawn from the transceiver unit to different stories or floors in the building, where one or more antennas are placed on each storey.

According to one embodiment, coaxial cables are drawn from the transceiver unit to passive antennas in the building, via so-called splitters. This solution is primarily intended for smaller buildings. It is not as effective in larger buildings, due to the high losses experienced in the coaxial cables, among other things.

Consequently, fibre optic cables are used in larger buildings between the transceiver unit and an active antenna unit at each storey, for instance. The active antenna unit converts light in the fibre optic cable to an RF-signal and vice versa, in addition to including a transceiver antenna. An installation of this nature may also be supplemented with a facility in which the active antenna unit also supplies passive antennas via splitters.

It is obvious that the known solutions to the problem of implementing mobile telephone systems in large buildings requires a large amount of coaxial cables and fibre optic cables to be laid in the building, and that a large number of splitters, combiners, antenna units and antennas must be installed. Such installation is very laborious and cost-demanding.

The present invention solves the aforesaid problems in a very simple and relatively very inexpensive manner.

The present invention thus relates to a method pertaining to a transceiver unit in a mobile telephone system in which the transceiver unit is installed in a building that includes a ventilation system for use for mobile telephone traffic within the building, said method being characterised by installing one or more antennas in one or more of the air ducts belonging to the building ventilation system and connecting said antennas to said transceiver unit.

The invention also relates to an arrangement that has essentially the characteristic features set forth in claim 7.

BRIEF DESCRIPTION OF THE DRAWINGS

The invention will now be described in more detail with reference to an exemplifying embodiment of the invention and also with reference to the accompanying drawing, in which.

DETAILED DESCRIPTION

The invention is described below with reference to a skyscraper, although it will be understood that the invention can be applied equally as well in other types of building, as mentioned earlier.

Figure 1:
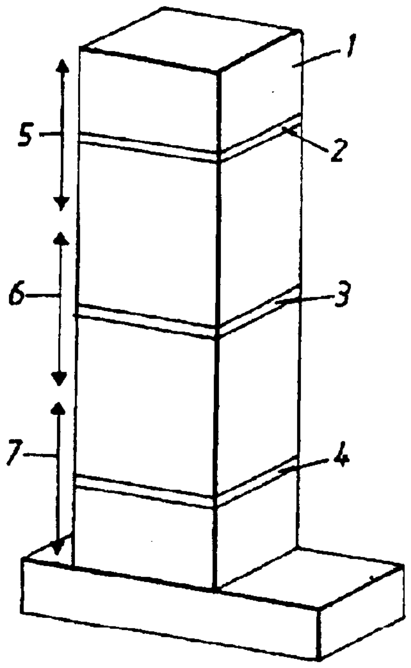
FIG. 1 is a schematic illustration of a skyscraper building.

FIG. 1 illustrates a typical skyscraper 1. Three particular stories 2, 3, 4 are marked in FIG. 1. These stories are used for an air-conditioning plant, and the supply of electric current and water. With respect to the air-conditioning system, an air-conditioning plant installed on such a storey, or floor, will normally serve a number of building stories, or floors, above and below the air-conditioning plant, as illustrated by the arrows 5, 6, 7. An air-conditioning plant may, for instance, serve six stories below the plant and six stories above the storey on which the plant is installed.

Instead of an air-conditioning plant, the system concerned may be a general ventilation system or a ventilation system for ventilation on the one hand and for heating the building on the other hand.

Figure 2:
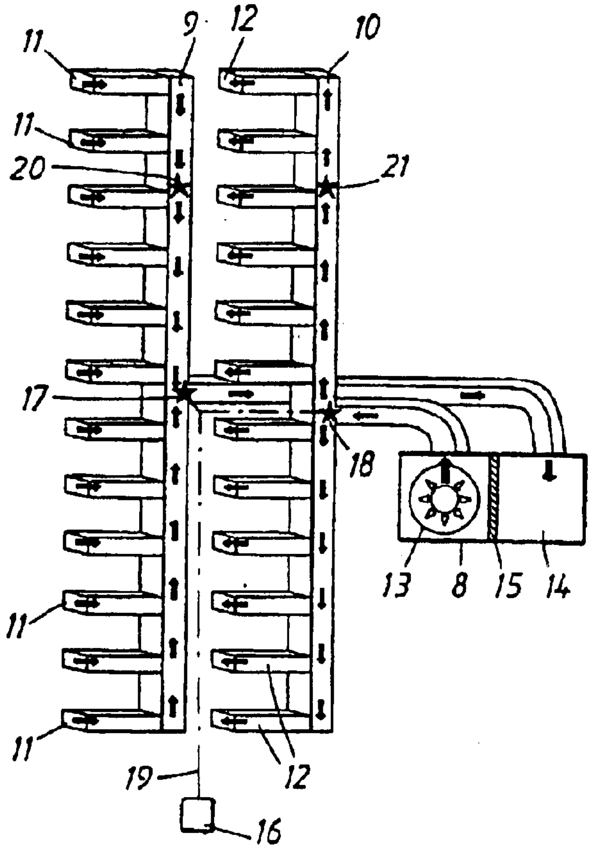
FIG. 2 is a schematic illustration of a ventilation system in the form of an air-conditioning system, and is a sectional view of the stories of a skyscraper building.

FIG. 2 is a schematic illustration of an air-conditioning plant 8 which distributes supply air and exhaust air to and from the various stories or floors via main air ducts 9, 10.

Provided on each storey is a secondary air duct 11, 12 which is connected to the main air duct 9, 10 and which distribute air to respective stories.

An air conditioning system includes a duct system 12, 10 which delivers air to different parts of the building, and a duct system 11, 9 which sucks air from different parts of said building. A blower 13 blows air into the air supply ducts. Exhaust air normally passes through a filter 14, before being released. The direction in which the air flows is arrowed in FIG. 2. A cooling and/or heating coil 15 is connected to the unit 8, for adjusting the temperature of the supply air. The design of an air-conditioning plant will, of course, vary in accordance with the size and geographical location of the building.

The various spaces, rooms, in the building will include openings through which air can enter and leave the space concerned. In an air-conditioned building, the openings are normally positioned to achieve a uniform air flow throughout the entire building. Such openings are normally placed in all rooms and in other spaces in the building.

The present invention relates to a method pertaining to a transceiver unit in a mobile telephone system in which the transceiver unit 16 is installed in a building for use in mobile telephone traffic within the building, and in which the building is provided with a ventilation system of known kind.

The transceiver unit 16 is of a known kind, such as a so-called base transceiver station, and is connected to the mobile telephone network concerned, normally via a fixed communications network. The transceiver unit 16 can be placed anywhere in the building, and more than one transceiver unit may be placed in the building.

According to the present invention, one or more antennas 17, 18 is/are installed in one or more of the air ducts 9, 10 of the building ventilation system, such as an air-conditioning system. The antenna/antennas 17, 18 is/are connected to the transceiver unit 16, this connection between antenna and transceiver unit being shown schematically by the chain line 19 in FIG. 2.

The antennas are, for instance, of the kind used for mobile telephones, i.e. omnidirectional antennas. It will be understood, however, that other antennas may be used when applying the present invention. For instance, antennas that have a directional effect may alternatively be used. For example, an antenna is installed by providing in the air duct a hole through which the antenna can be inserted. Alternatively, an antenna is installed in the air duct and held in place by means of an appropriate fastener.

In one preferred embodiment of the invention, at least one antenna is installed in a main air duct 9, 10, as illustrated with the antennas 17, 18 in FIG. 2. The main air ducts communicate with a number of smaller or secondary air ducts 11, 12 which open into different rooms in the building. The grating normally located adjacent the orifice of respective air ducts 11, 12 in a room or some other space in the building shall be designed to allow the radio signals concerned to pass freely through said orifice. This requirement is satisfied by using plastic gratings.

The antennas have, for instance, a transmission power of only 0.5 W at a transmission frequency of 1800 MHz. Trials with such antennas and conventional GSM telephones have shown that extremely effective contact is obtained between the antennas and mobile telephones in a building in which the present invention has been applied in the aforedescribed manner.

However, the person skilled in this art will realise that frequency and output power can be chosen in accordance with the radio system to be used.

Because the antennas are placed centrally in the air-conditioning system, a signal sent by the transceiver unit via the antennas will propagate generally equally throughout that part of the building to which the main air ducts concerned extend. Similarly, a signal sent by a mobile telephone will be conducted via an orifice of said kind in a building space into a smaller air duct 11, 12 and through said duct to a main air duct 9, 10 and therewith to an antenna 17, 18.

In one embodiment of the invention, at least one antenna is installed in each section 5, 6, 7 of the air ducts 9, 10 of the air-conditioning system, where each of said sections serves a given number of stories, or floors, in the building. One such section may conveniently include from 12 to 24 stories of a skyscraper, although it will be understood that the number of stories served will depend on the design of the air-conditioning system.

When many stories are served by one and the same main air duct, it is highly beneficial to install one or more additional antennas in each section of the air ducts 9, 10 of the air-conditioning system, where each of the sections serves different parts of the building. This is illustrated in FIG. 2 with the additional antennas 20, 21.

According to one preferred embodiment, one or more antennas are installed in the supply air ducts 10 and one or more antennas are installed in the exhaust air ducts 9. Because the orifices of the supply air system and the exhaust air system respectively in the various spaces of the building are often positioned at different places in said spaces, this embodiment provides effective and uniform radio coverage.

Figure 3:
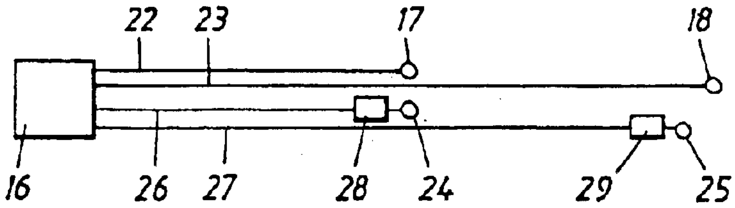
FIG. 3 is a schematic, diagrammatic illustration of an installation in a building.

In one embodiment, the antennas 17, 18, 20, 21 are passive antennas and are connected to the transceiver unit 16 via coaxial cables 22, 23, as illustrated in FIG. 3.

Alternatively, the antennas 24, 25 are active antennas which are connected to the transceiver unit 16 via fibre optic cables 26, 27. In this case, the active antennas include a device 28, 29 which converts light in the fiber optic cable to an RF-signal and vice versa, in addition to including a transmitting and receiving antenna.

Figure 4:
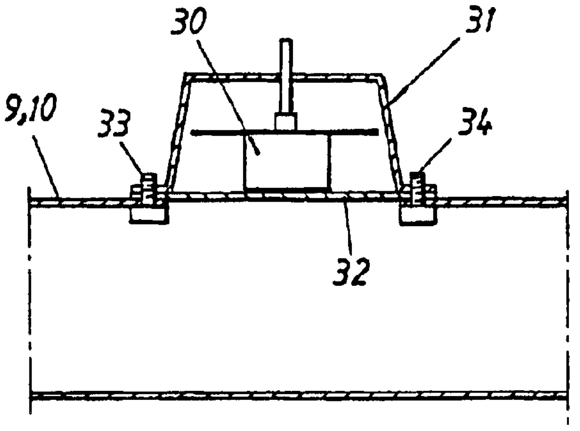
FIGS. 4–6 show alternative antenna installations.
Figure 5:
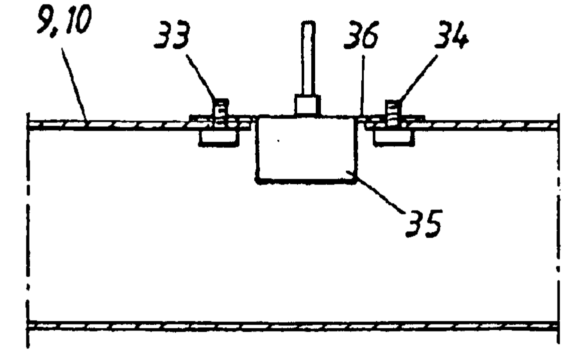
Figure 6:
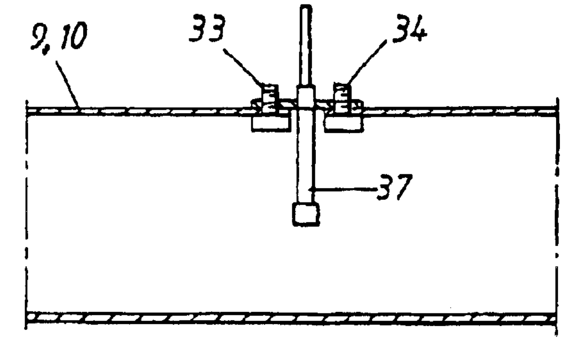

FIGS. 4, 5 and 6 illustrate alternative antenna installations in air ducts 9, 10.

FIG. 4 shows an antenna 30 which is housed in a metallic housing 31. An opening has been made in the duct and covered with a non-metallic cover 32, for instance a plastic cover. The cover 32 and the housing 31 are secured in the duct 9, 10 by means of a screw joint 33, 34. The antenna 30 may be a directional antenna or some other suitable type.

FIG. 5 shows an antenna 35 which is carried by a plate 36 that covers an opening in the air duct 9, 10. The plate 36 is secured to the duct 9, 10 by means of a screw joint 33, 34. The antenna is suitably an omnidirectional antenna.

FIG. 6 shows an antenna arrangement in which the antenna 37 projects into the air duct 9, 10. The antenna 37 is secured to the duct 9, 10 by means of a screw joint 33, 34. The antenna may be a dipole antenna or some other suitable type.

Both active and passive antennas may be used in one and the same system and placed at mutually different positions.

The person skilled in this art will have no trouble in determining the number of antennas required and their positions in the air ducts in obtaining the desired radio coverage.

It will be obvious that the present invention requires a minimum of installations in a building in comparison with the installations required when applying the aforedescribed known technology, by virtue of the fact that the existing air duct infrastructure of a building is used as wave guides.

The present invention thus provides a significant advance in enabling highly effective radio coverage for mobile telephony to be obtained in a building quickly and inexpensively, and also to provide very high speech quality and high capacity.

Although the invention has been described with reference to a number of embodiments and with reference to only one section of an air-conditioning system, it will be understood that the invention can be varied in different ways to achieve the radio coverage desired. Instead of placing antennas in air-conditioning duct sections that lie at different heights above each other, the antennas may equally as well be placed in different sections of air-conditioning ducts that are located horizontally one after the other, as in a large, elongated air terminal building.

The present invention shall not therefore be considered as limited to the aforedescribed exemplifying embodiment, since variations can be made within the scope of the accompanying claims.

What is claimed is:

1. A method relating to a transceiver unit in a mobile telephone system wherein the transceiver unit is installed in a building and used for mobile telephone traffic within the building, and wherein the building includes a ventilation system, the method comprising:

providing one or more antennas in a location to transmit and receive signals in one or more air ducts belonging to the ventilation system of said connecting said antenna or antennas to the transceiver unit;

wherein two-way wireless mobile telephone communication between at least one mobile telephone device in a room or space in the building and at least one antenna via the one or more air ducts acting as a waveguide for the wireless mobile telephone communication is enabled.

2. A method according to claim 1, characterized by providing at least one antenna in communication with a main air duct that communicates with a plurality of smaller or secondary air ducts which open into rooms and spaces in the building.

3. A method according to claim 1, characterized by providing one or more antennas in communication with each of a plurality of sections of the air ducts of said ventilation system where each of said sections serves a respective different part of the building.

4. A method according to claim 1, characterized by providing one or more antennas in communication with air ducts that deliver supply air to the building and providing one or more antennas in communication with exhaust air ducts.

5. A method according to claim 1, characterized in that one or more antennas are passive antennas connected to the transceiver unit via coaxial cables.

6. A method according to claim 1, characterized in that one or more antennas are active antennas connected to the transceiver unit via fiber optic cables.

7. The method according to claim 1, wherein wireless signals transmitted by a mobile telephone device in a room or space in the building are received into the one or more air ducts through an opening in the one or more air ducts that is transparent to the wireless signals.

8. The method according to claim 1, wherein wireless signals transmitted by a mobile telephone device in a room or space in the building are introduced into the one or more air ducts without the use of an antenna positioned in the one or more air ducts.

9. An arrangement relating to a transceiver unit in a mobile telephone system in which said transceiver unit is installed in a building and used for mobile telephone traffic within said building, and wherein the building includes a ventilation system, characterized in that one or more antennas is/are installed to transmit and receive signals in one or more air ducts belonging to the ventilation system of said building and connected to the transceiver unit, wherein two-way wireless mobile telephone communication between at least one mobile telephone device in a room or space in the building and at least one of the antennas via the one or more air ducts acting as a waveguide for the wireless mobile telephone communication is enabled.

10. An arrangement according to claim 9, characterized in that at least one antenna is installed in communication with a main air duct that communicates with a number of smaller or secondary air ducts which open into different rooms and spaces in the building.

11. An arrangement according to claim 9, characterized in that one or more antennas are installed in communication with each of a plurality of sections of said ventilation system, where each of said sections is intended to serve a different part of the building.

12. An arrangement according to claim 9, characterized in that one or more antennas are installed in communication with air supply ducts for delivering supply air to the building; and in that one or more antennas are installed in communication with exhaust air ducts.

13. An arrangement according to claim 9, characterized in that one or more of the antennas are passive antennas connected to the transceiver unit via coaxial cables.

14. An arrangement according to claim 9, characterized in that one or more of the antennas are active antennas connected to the transceiver unit via fiber optic cables.

15. The arrangement according to claim 9, wherein wireless signals transmitted by a mobile telephone device in a room or space in the building are received into the one or more air ducts through an opening in the one or more air ducts that is transparent to the wireless signals.

16. The arrangement according to claim 9, wherein wireless signals transmitted by a mobile telephone device in a room or space in the building are introduced into the one or more air ducts without the use of an antenna positioned in the one or more air ducts.

17. A method for directing radiation through the ventilation system of a building comprising:

placing at least two antennas in a position relative to an air duct of the ventilation system to introduce radiation into the ventilation system;

connecting the at least two antennas to a transceiver; and providing wireless communication between the at least two antennas and communication devices in rooms and spaces in the building via the air duct, wireless communication signals being carried in the air duct acting as a waveguide without the use of a bidirectional coupler or re-radiator positioned in the air duct between the communication devices and the at least two antennas.

18. The method as claimed in claim 17, wherein the step of placing includes placing at least two antennas in each of a plurality of air ducts of the ventilation system.

19. The method as claimed in claim 18, wherein the step of placing further includes placing a plurality of antennas in each of the plurality of air ducts in the ventilation system.

20. A ventilation system of a building comprising:

a plurality of air ducts having sections that each serve a respective different part of the building; and at least one antenna positioned relative to each of the sections of the air ducts, and connected to a transceiver in order to introduce radiation into the ventilation system and provide two-way wireless communication between a respective different part of the building and the transceiver via a respective section of the air ducts that acts as a waveguide for signals transmitted by the at least one antenna and for signals transmitted from parts of the building outside of the air ducts.

21. A ventilation system as claimed in claim 20, wherein the ventilation system includes at least one antenna in communication with each of the air ducts.

22. A ventilation system as claimed in claim 21, wherein the ventilation system includes a plurality of antennas in communication with each of the air ducts.

23. A ventilation system as claimed in claim 20, wherein the at least one antenna wirelessly communicates with a device located in a room or space of the building by emitting a signal that is carried in at least one section of the air ducts and passes into the room or space through an opening in the at least one section of the air ducts to be received by the device, and by receiving a signal that is transmitted by the device, passes through the opening in the at least one section of the air ducts and is carried in at least one section of the air ducts to the at least one antenna.

24. A method of providing wireless communications, comprising:

providing at least one antenna in communication with at least one air duct that is part of a ventilation system in a building;

emitting a first signal from the at least one antenna;

transmitting the first signal in the at least one air duct acting as a waveguide between the at least one antenna and an opening in the at least one air duct, the opening being transparent to the first signal;

passing the first signal through the opening into a room or space in the building to be received by a wireless communication device;

receiving a second signal transmitted by the wireless communication device through the opening into the at least one air duct;

transmitting the second signal in the at least one air duct acting as a waveguide between the opening and the at least one antenna; and receiving the second signal at the at least one antenna.

25. The method of claim 24, wherein the step of transmitting the first signal comprises:

transmitting the first signal from the antenna to the opening without the use of a bi-directional coupler or a re-radiator; and the step of and transmitting the second signal comprises:

transmitting the second signal from the opening to the antenna without the use of a bi-directional coupler or a re-radiator.

26. The method of claim 25, wherein the step of providing at least one antenna comprises:

providing at least two antennas in communication with at least one air duct.

27. A method of providing wireless communications, comprising:

providing at least one antenna in communication with at least one air duct that is part of a ventilation system in a building;

receiving a wireless signal transmitted by a wireless communication device in the building through an opening in the at least one air duct;

transmitting the wireless signal in the at least one air duct acting as a waveguide between the opening and the at least one antenna; and receiving the wireless signal at the at least one antenna.

* * * * *

UNITED STATES PATENT AND TRADEMARK OFFICE

CERTIFICATE OF CORRECTION

PATENT NO. : 6,801,753 B1
DATED : October 5, 2004
INVENTOR(S) : Teng Boon Keong

It is certified that error appears in the above-identified patent and that said Letters Patent is hereby corrected as shown below:

Column 5,
Line 60, should read as follows:
-- to the ventilation system of said building, and --

Signed and Sealed this

Fifteenth Day of March, 2005

JON W. DUDAS
*Director of the United States Patent and Trademark Office*